United States Patent [19]

Telander

[11] Patent Number: 4,553,567
[45] Date of Patent: Nov. 19, 1985

[54] PIPE THREAD PROTECTOR

[76] Inventor: Lee W. Telander, 1810 Manor Dr., Alexandria, Minn. 56308

[21] Appl. No.: 709,823

[22] Filed: Mar. 7, 1985

Related U.S. Application Data

[63] Continuation of Ser. No. 605,126, Apr. 30, 1984, abandoned, which is a continuation-in-part of Ser. No. 282,067, Jul. 10, 1981, abandoned.

[51] Int. Cl.⁴ .......................................... B65D 59/00
[52] U.S. Cl. ................................................ 138/96 T
[58] Field of Search ............... 138/89, 96 T; 215/317, 215/318, 319, 320, 355, 356, 357, DIG. 1; 220/289; 285/DIG. 22; 411/373, 417, 418, 437, 508, 509, 510

[56] References Cited

U.S. PATENT DOCUMENTS

| | | | |
|---|---|---|---|
| 1,860,886 | 5/1932 | Brownstein | 138/96 T |
| 2,627,877 | 2/1953 | Phillips | 138/96 T |
| 3,069,040 | 12/1962 | Corsette | 215/318 |
| 3,254,785 | 6/1966 | Lovell | 215/320 X |
| 3,854,371 | 12/1974 | Lamothe | 138/96 T |
| 4,139,023 | 2/1979 | Turley | 138/96 T |
| 4,162,736 | 7/1979 | Faulstich | 215/320 X |
| 4,325,487 | 4/1982 | Libit | 215/DIG. 1 |
| 4,399,092 | 8/1983 | Snow, Sr. et al. | 138/96 T X |
| 4,411,934 | 10/1983 | Steinhagen | 138/96 T X |

FOREIGN PATENT DOCUMENTS

| | | | |
|---|---|---|---|
| 202476 | 6/1958 | Austria | 215/DIG. 1 |
| 1915147 | 9/1970 | Fed. Rep. of Germany | 215/317 |
| 64824 | 12/1955 | France | 215/355 |
| 344549 | 1/1960 | Switzerland | 411/510 |
| 520169 | 8/1940 | United Kingdom | 411/510 |

Primary Examiner—Stephen Marcus
Assistant Examiner—Mark Thronson
Attorney, Agent, or Firm—Burd, Bartz & Gutenkauf

[57] ABSTRACT

A protector for a threaded end section of a cylindrical part, such as pipe, has a tubular body having a plurality of flexible ribs projecting from a wall of the body. The ribs, in an unflexed condition, extend at an acute angle in a forward direction toward the pipe upon which the protector is placed on the threaded end section of the pipe. The body is disposed in space telescoped confronting relation to the threaded end section of the pipe to preclude circumferential and radial destructive stress between the body and the threaded end of the pipe. In one embodiment the ribs comprise first ribs engageable with the threaded end section of the pipe and second ribs located adjacent the first ribs in holding engagement with the threaded end section of the pipe.

24 Claims, 16 Drawing Figures

U.S. Patent  Nov. 19, 1985  Sheet 1 of 4  4,553,567
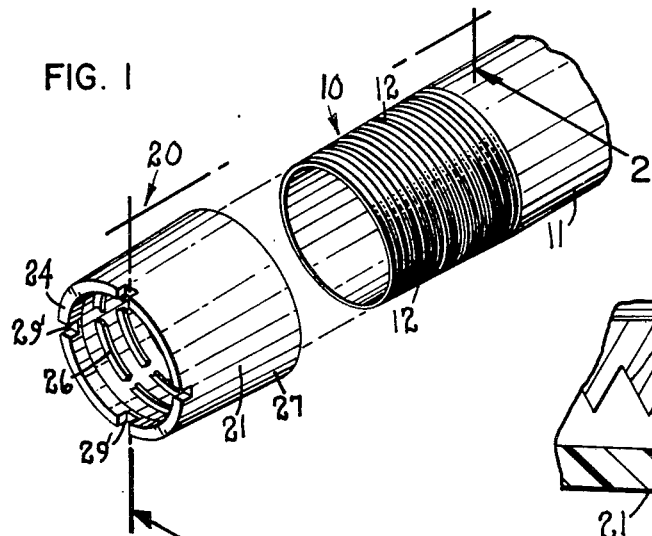
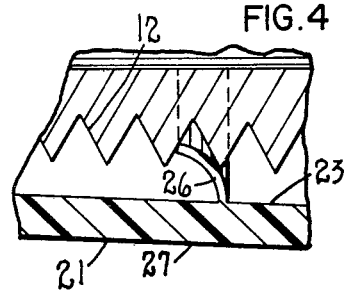
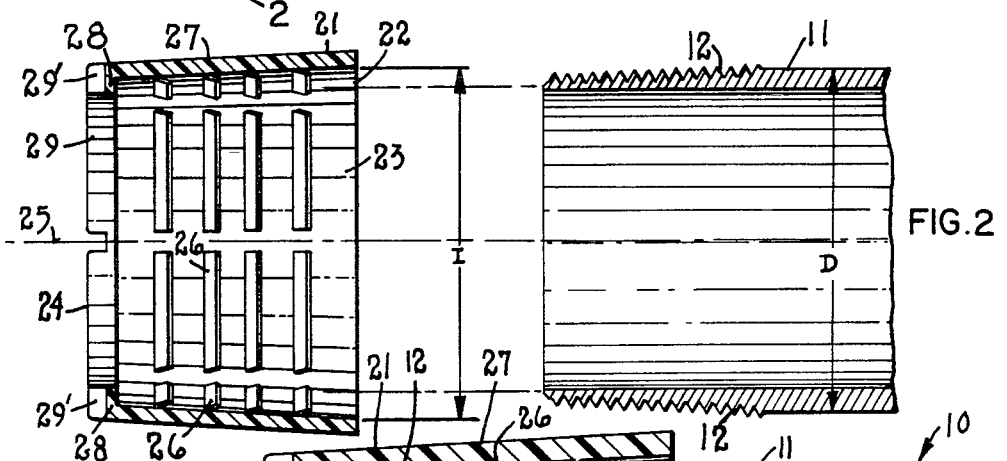
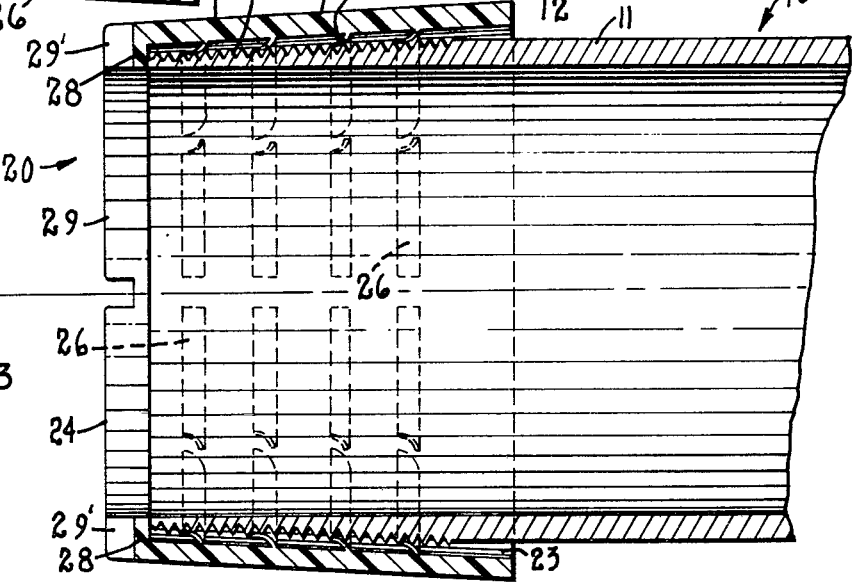

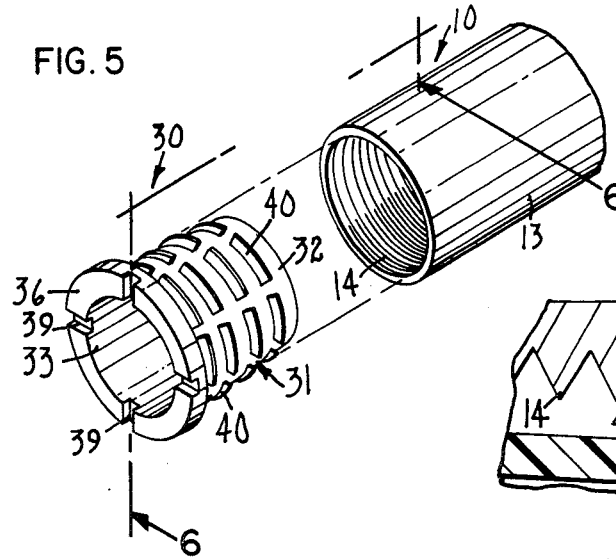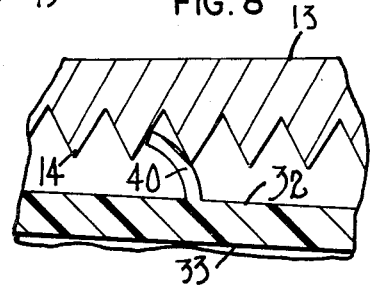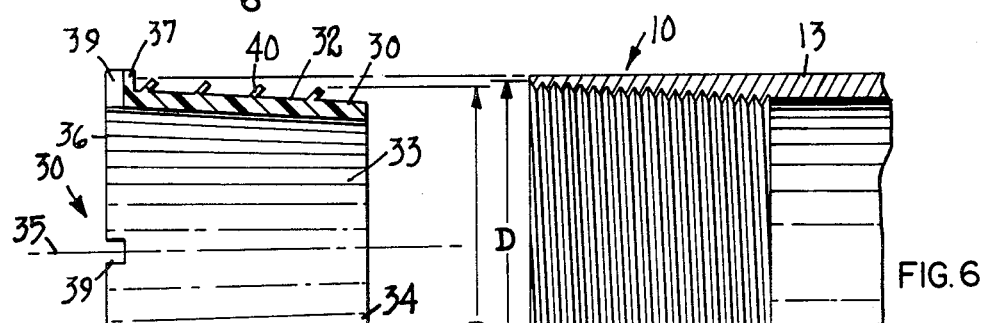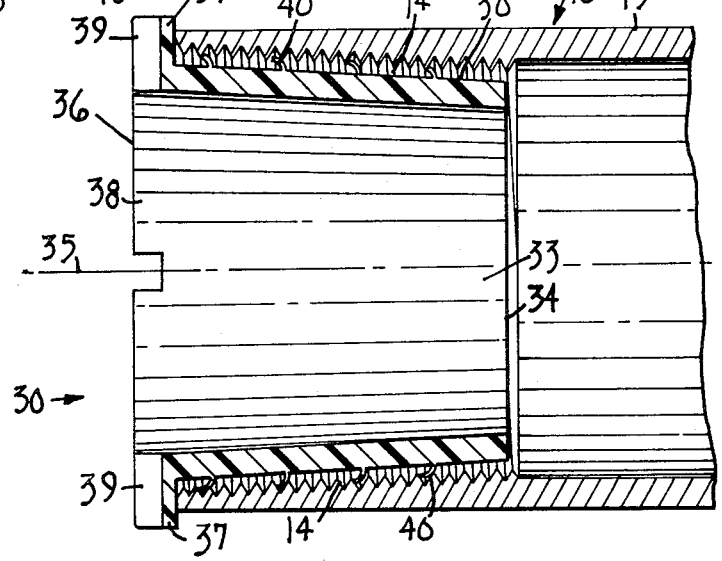

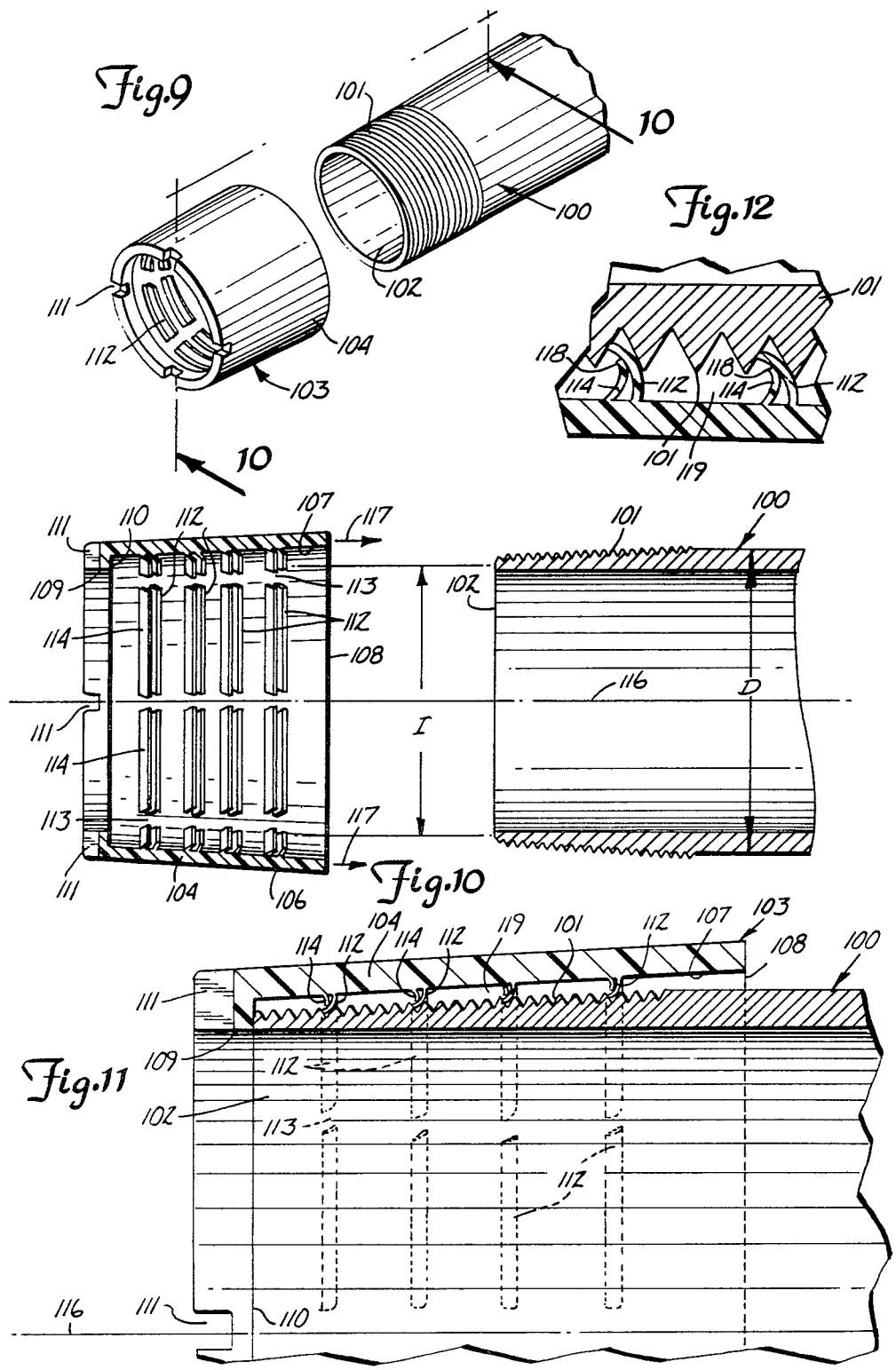

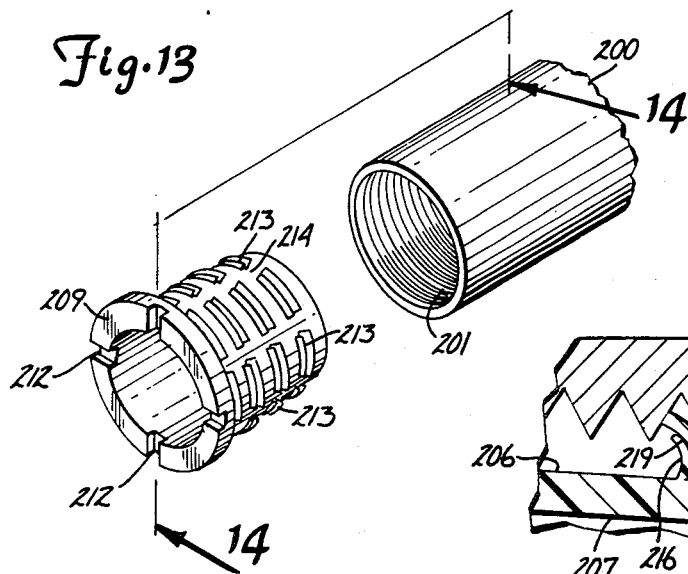
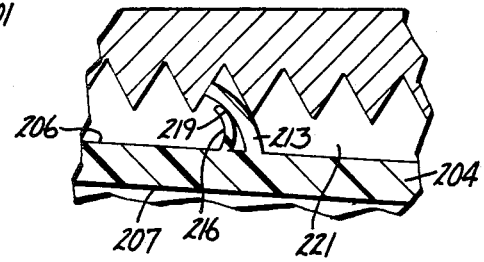
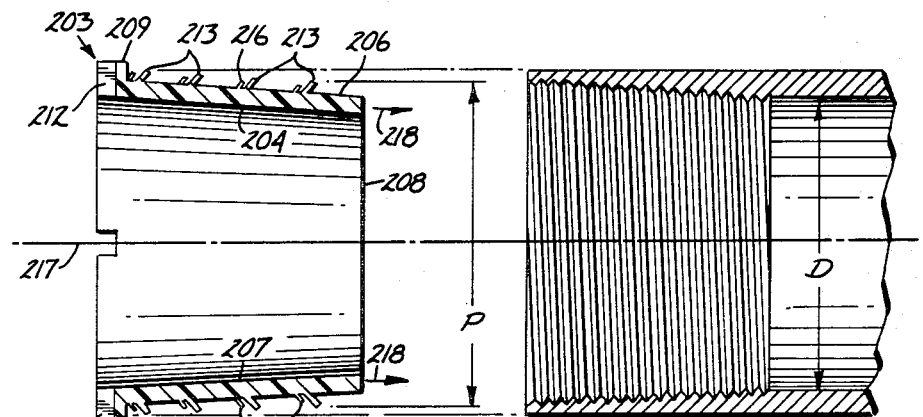
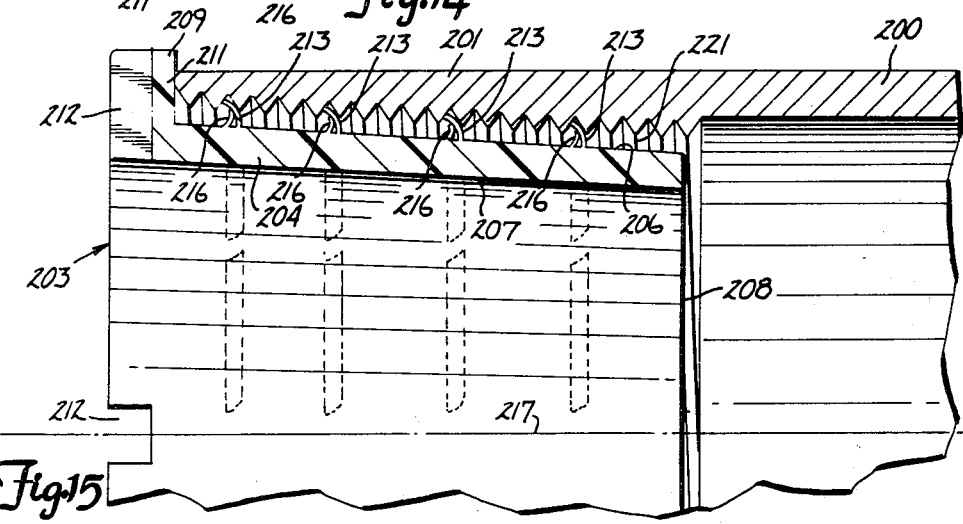

PIPE THREAD PROTECTOR

CROSS REFERENCE TO RELATED APPLICATION

This is a continuation of application Ser. No. 605,126 filed 4/30/84, abandoned, which is a continuation-in-part of U.S. application Ser. No. 282,067 filed July 10, 1981, abandoned.

TECHNICAL FIELD

The invention relates to thread protectors adapted to be applied to the ends of pipes, tubes and like machine parts to protect screw threads of such parts against mechanical and chemical damage and contamination by foreign matter during handling, shipping and storage.

BACKGROUND OF INVENTION

Pipes used in the drilling, production, and transportation of oil and gas have internal and external threaded ends. Various protectors for threaded pipe ends have been proposed. Generally, these pipe thread protectors have threads that are turned onto the threads of the pipes. These protectors are subject to many problems including vibrating loose and falling off during transport or popping off during extreme temperature changes, such as found in arctic and tropic enviroments. Protectors that are threaded onto the pipe ends can be difficult to remove in a manner to allow for the re-use of the protector. Examples of prior U.S. patents relating to pipe thread protectors are described as follows:

Brownstein in U.S. Pat. No. 1,860,886 discloses a metal band pipe protector that is interlocked into a sleeve. The sleeve has a plurality of thread engaging lugs for retaining the protector in assembled relation on the pipe.

Phillips in U.S. Pat No. 2,627,877 shows a thread protector having a sleeve with threads adapted to thread onto the threads of the pipe.

Turley in U.S. Pat. No. 4,139,023 discloses a plastic pipe thread protector provided with threads that cooperate with the threads on the pipe to retain the protector on the pipe.

SUMMARY OF INVENTION

The present invention is a protector for a threaded pipe or the like which can readily be placed on the threaded end section of a pipe and is retained thereon in the manner so that it does not vibrate loose or fall off during transportation and storage. The protector under extreme enviromental temperature changes will not pop off or split open when subjected to extreme cold of Canada and Alaska or extreme heat of Saudi Arabia.

The protector has a one-piece tubular body of substantially rigid plastic material for telescoping reception and substantial concentric positioning in an unsealed relation with respect to a threaded end section of a pipe. The body has first and second ends and inner and outer wall surfaces extending between the ends. The first end of the protector is of a size to allow the body to be located adjacent the threads to cover the same. The second end of the body has radially projecting stop means for engagement with the pipe end to limit the telescoping motion of the body with respect to the pipe. The wall of the body is disposed in spaced telescopic confronting relation with respect to the threaded end section of the pipe to allow the pipe to expand and contract without applying destructive stress to the body of the protector. A plurality of circumferentially disposed flexible ribs means extend freely from the wall and engage the threaded pipe end section of the pipe. The unrestrained ribs means are located at an angle acute to the wall and normally extend in the direction from the second end to the first end of the body. The rib means have sufficient flexibility to revert upon engagement and an axial telescopic motion with respect to the threaded end section and thereby extend in a direction from the first end towards the second end of the body. This reverse flexing or reverting of the ribs means retains the rib means in locking engagement with the threads of the threaded end section of the pipe.

The rib means in one embodiment of the protector comprise a plurality of relatively thin, flexible ribs project from the body in an angled plane with respect to the longitudinal axis of the body and in a direction generally towards the pipe upon which the protector is being placed. The ribs are resilient and flex in a reverse direction as they contact and engage portions of the threads on the pipe. In this way, the ribs of protector are wedged upon the threaded end portion of the pipe. The ends of adjacent ribs are spaced from each other to allow water and air to flow through the protector. The inside wall of the body is spaced from the threads so that the pipe can expand and contract without substantially increasing the force on the body. The spaced relationship between the inside wall of the body and threaded end section of the pipe precludes circumferential and radial stress contact due to thermal expansion and contraction of the pipe.

Another embodiment of the protector has a body of a size so that it can be disposed in spaced telescopic confronting relation with respect to the threaded end section of the pipe. The spaced relationship between the body and the threaded end section of the pipe allows the pipe to expand and contract without applying destructive stress to the body of the protector. Rib means joined to the body firmly hold the protector on the pipe. The rib means comprise first rib members and second rib members located adjacent the first rib members. The first and second rib members project at an acute angle with the body in an unflexed condition in the direction from the second end to the first end of the body. The rib members extends in the direction in which the protector is moved to mount it on the threaded end section of the pipe. The first rib members engage the threaded end section of the pipe and have sufficient flexibility to revert or bend backwards when the protector is moved onto the threaded end section of the pipe. The first rib members contact the second rib members as they are reverted so that the second rib members bias and hold the first rib members in firm engagement with the threaded end section of the pipe. The first and second rib members each comprise circumferentially disposed arcuate segments. Adjacent segments are separated from each other to provide spaces allowing fluids to flow through the space between the protector and threaded end section of the pipe.

These and other aspects of the protector of the present invention are embodied in the following specification of several embodiments of the protector and the claims.

DESCRIPTION OF DRAWING

FIG. 1 is a perspective view of a first embodiment of the protector prior to placement on the external threaded end section of a pipe;

FIG. 2 is an enlarged cross sectional view taken along line 2—2 of FIG. 1;

FIG. 3 is an enlarged longitudinal cross sectional view of the protector of FIG. 1 in assembled relation with an external threaded end section of a pipe;

FIG. 4 is an enlarged detail cross sectional view of a portion of the protector in assembled relation with the external threaded end section of a pipe;

FIG. 5 is a perspective view of a second embodiment of the protector of the invention prior to placement into the internal threaded end section of a pipe;

FIG. 6 is an enlarged sectional view taken along the line 6—6 of FIG. 5;

FIG. 7 is an enlarged sectional view of a protector of FIG. 5 in assembled relation with the internal thread end section of a pipe;

FIG. 8 is an enlarged detail view of the portion of the protector in assembled relation with the threaded end section of a pipe;

FIG. 9 is a perspective view of a third embodiment of the protector of the invention prior to placement on the external threaded end section of a pipe;

FIG. 10 is an enlarged sectional view taken along the line 10—10 of FIG. 9;

FIG. 11 is an enlarged fragmentary sectional view of the protector of FIG. 9 in assembled relation on the external threaded end section of a pipe;

FIG. 12 is an enlarged detail sectional view of a portion of the protector of FIG. 9 in assembled relation on the external threaded end section of a pipe;

FIG. 13 is a perspective view of a fourth embodiment of the protector of the invention prior to placement into an internal threaded end section of a pipe;

FIG. 14 is an enlarged sectional view taken along the line 14—14 of FIG. 13;

FIG. 15 is an enlarged fragmentary sectional view of the protector of FIG. 13 in assembled relation with an internal threaded end section of a pipe;

FIG. 16 is an enlarged detailed sectional view of a portion of the protector of FIG. 13 in assembled relation with the internal threaded end section of a pipe.

DESCRIPTION OF THE PREFERRED EMBODIMENTS

Referring to FIG. 1, protector 20 is a cover or cap which fits over the exteriorly threaded end section 11 of pipe 10. Pipe 10 can be made from plastic, metal, or other material. The pipe can be a metal casing or tubular member having a threaded end section. An example of a casing size upon which the invention is adaptable would be a casing having a $4\frac{1}{2}''$ casing diameter with $\frac{3}{4}''$ T.P.F. or eight threads per inch. The protector can be modified to fit any number of various casing and thread specifications. The protector is usable with threaded machine parts, such as shafts, axles, projections and bosses to protect these parts from damage.

Protector 20 is made from polyethylene plastic material having desirable physical and chemical properties necessary to achieve the objects of the invention. The material is a lightweight, low cost and durable in use. Other types of plastic materials can be used to make protector 20. For example, a low temperature, high impact strength, chemical resistant thermoplastic can be used to make the protectors herein described. The shape of protector 20 is one which lends itself to being conveniently molded in one piece.

From FIGS. 1–3, it can be seen that protector 20 has a generally tubular-shaped body 21. Body 21 is slightly tapered from first end 22 to second end 24. Both first and second ends 22, 24 of body 21 are shown open, however, end 24 could be a closed end without affecting the operation of the protector. A longitudinal axis 25 extends centrally through the interior passage body 21. The inside diameter of body 21 is indicated by "I" in FIG. 2.

A plurality of circular rows of ribs 26 are molded to project from the interior wall 23 of body 21. Ribs 26 are tab-like members extending inwardly at an acute angle towards pipe 10 such that the planes if extended would intersect axis 25 at an angle less than 90°. In the preferred embodiment, ribs 26 are shown as rib segments located in spaced-apart relationship about respective perimeters of interior wall 23. Split or segmented rings of ribs 26 can be molded easily and allow water and air to flow through the protector when located in assembled relation on pipe 10. Protector 20 has four split perimeters of individual ribs 26. Ribs 26 are flexible and resilient. A rib wall thickness can be approximately 0.025 inches. The use of at least six rib segments about each perimeter is the preferred construction when polyethylene is the material used to make the protector. This particular design specification allows easier placement upon and removal from the threaded end section of a pipe.

At end 24 of protector 20 a portion of the protector's exterior wall 27 extends inwardly to form an annular lip or stop shoulder 28. Projecting from the peripheral stop shoulder 28 is part of a sleeve 29 having a plurality of notches or grooves 29'. Grooves 29' are provided to assist the use of a spanner wrench or like tool in the removal of protector 20 from pipe 10 by turning the protector relative to the threads on the pipe. Alternative means for removing the protector without damaging it or the pipe can be used.

To use protector 20, body 21 is aligned with the threaded pipe end section 11 such that ribs 26 extend towards pipe 10 as shown in FIGS. 1 and 2. Protector 20 is then pushed on to the pipe end section 11 until the pipe end contacts lip 28 and is stopped from further movement. The protector body 21 is of sufficient size that its inside diameter, I, is slightly greater than the outside diameter, D, of pipe 10. This allows ribs 26 to frictionally engage threads 12 of pipe 10 and thus prevent protector 20 from vibrating loose. As protector 20 is being pushed onto the tubing end portion 11, the flexible ribs 26 flex or bend back and become wedged between threads 12 and body 21 as shown in FIG. 4. The ribs 26 in engagement with threads 12 flex or revert to a second position which in a direction opposite the direction of the unflexed ribs. Body wall 23 is spaced outwardly from the threads 12 providing space to allow the ribs 26 to flex and change positions. This space also allows pipe 10 to expand and contract without applying destructive stress to body 21. Ribs 26 are not permanently deformed by such flexing as the plastic used has a memory which will allow ribs 26 to flex back to their molded position when the protector 20 is removed from pipes 10. Furthermore, should the pipe 10 expand as a result of temperature changes, the memory of the plastic material will cause ribs 26 to flex outward and towards their original or first position a distance sufficient to keep protector 20 locked upon threads 12. Regardless of temperature changes or vibrating forces, protector 20 will stay frictionally engaged upon pipe 10, The protector 20 is removed by unscrewing it from the pipe end section 11.

Referring to FIGS. 5-8, the second embodiment of the present invention is directed to use upon the end portion 13 of a piece of pipe 10 where the threads are upon the interior wall of the pipe. The pipe can be plastic, metal or other material. This embodiment can be referred to as a protector plug. Protector 30 has a generally tubular-shaped body 31 including an exterior wall 32 and an interior wall 33. A longitudinal axis 35 extends centrally through body 31. An outside body diameter is referenced in the drawings as P. Both first and second ends of the protector body 34, 36 may be open. In the alternative, the end 34 placed within pipe 10 can be closed for purposes of keeping moisture and foreign particles from entering the tubing interior. The opposite end 36 is formed with a lip 37 projecting outwardly from the end edge periphery of the exterior wall 32 as can be seen in FIGS. 6 and 7. Lip 37 prevents the entire protector body 34 from being inserted within pipe 10 as can be seen in FIG. 7. A portion 38 of lip 37 includes means 39 for assisting in the removal of the protector 30 from pipe 10. The means 39 is shown as notches or grooves in FIGS. 5-7 which cooperate with a spanner wrench or similar tool to allow protector 30 to be unthreaded from pipe 10. In the alternative, the means 39 can be any other suitable structure which provides sufficient grasping for turning the protector 30 to remove it from its engagement with the pipe threads 12.

A plurality of ribs or tab-like members 40 extend from exterior wall 32 of protector 30. The outside diameter, P, of body 31 is slightly less than the pipe inside diameter, d, so that protector 30 can be inserted into pipe 10. Ribs 40 are molded at an acute angle outwardly from wall 32, and lie in respective planes which if extended would interest a vertical at an angle less than 90° Ribs 40 project generally outwardly from central axis 35 in a direction generally towards that which protector 30 travels as it is being inserted into pipe 10 or toward end 34. Rib wall thickness can be approximately 0.025 inches. A plurality of rib segments are used in each rib ring. For example, at least six rib segments can be used in each rib perimeter. Four rib rings or perimeters are shown in this embodiment.

To use protector 30, one merely pushes it straight into the pipe threaded end section 13 until the pipe end abuts protector lip 37. This placement is possible as the protector 30 outside diameter, P, is less than the pipe inside diameter, d. As protector 30 is being inserted into pipe 10, flexible ribs 40 are reverted, reverse flexed or bent back as illustrated in FIG. 8. Each of the ribs 40 frictionally engages respective threads 14 and are wedged therebetween, locking protector 30 within pipe 10. If vibration of pipe 10 occurs or there is a temperature change in pipe 10, the protector 30 will not pop out or become loosened. The memory of the plastic material allows the ribs 40 to flex and adjust their positions with respect to that of threads 14. The protector 30 remains in pipe 10 until it is intentionally removed by unthreading it from its wedged position within the pipe 10. With proper removal, the protector 30 can be reused again.

Referring to FIGS. 9 to 12, there is shown a third modification of the protector of the invention indicated generally at 103. Protector 103 is a one-piece tapered tubular member adapted to be placed upon and cover threaded end section 101 of a pipe, tube, or tubular member 100. As shown in FIG. 9, pipe 100 has an open end 102 surrounded by threaded end section 101. As shown in FIG. 11, protector 103 fits over threaded end section 101 and covers and protects the threads thereon. The threads can be different types and shapes, including standard, slimline, hydril and like pipe threads.

Protector 103 has the tubular body 104 made from the relatively rigid material such as rigid plastic. The plastic material can be the same as disclosed herein for protector 20. The body 104 has a smooth continuous outer wall 106 and inside wall 107. Body 104 also has a forward or large diameter end 108 and a rear or outside end having an inwardly directed lip 109. Lip 109 has an annular inside shoulder 110 and a plurality of radial grooves or notches 111. Notches 111 are circumferentially spaced from each other and are used to accommodate a tool, such as a spanner wrench, to remove protector 103 from pipe 100. As seen in FIG. 11, body 104 convergingly tapers from end 108 to lip 109. The taper generally follows the taper of threaded end section 101.

A plurality of flexible first ribs 112 are integral with the inside wall 107 of body 104. Ribs 112 are arcuate flexible tab members extended forwardly at an acute angle relative to inside wall 107. Ribs 112 are longitudinally spaced in four circumferential rings. Each ring of ribs 112 has rib segments separated with a plurality of circumferential space 113. The spaces 113 allow fluids, such as gases and liquids, to flow through protector 103 without interfering with its function to cover the threads of end section 101. As shown in FIGS. 10 and 12, second ribs 114 are located adjacent the back or outside of first ribs 112. Second ribs 114 are arcuate tab segments integral with wall 107 that coincide in length with first ribs 112. Ribs 114 are flexible spring members that are shorter than ribs 112.

In use, protector 103 is aligned with the threaded end section 101 of pipe 100. Protector 103 is moved onto threaded end section 101 of pipe 100. Protector 103 is moved onto threaded end section 101 in the direction of arrow 117. The inside wall 107 is disposed in telescoped confronting relation to the threaded end section 101 and space therefrom with a space 119. First ribs 112 in the unflex condition normally extend in the direction from the second end 109 towards the first end 108 of body 104. The ribs 112 have sufficient flexibility to invert or flex back on engagement of the threads of the end section 101 and are flexed to extend in a direction from the first end 108 to the second end 109 of body 104. The flexed first ribs 112 engage the outer ends of the flexed second ribs 114. The second ribs 114 function as biasing members or springs that force and hold the outer ends of the first ribs 112 into engagement with the threads on end section 101 as shown in FIG. 12. The outer or fulcrum ends of second ribs 114 engage intermediate sections of first ribs 112 and bias ribs 112 in an inward direction to firm engagement with the threads of end section 101. The flexible ribs 112 and 114 concurrently cooperate to preclude circumferential and radial destructive stress contact between the threaded end section 101 of pipe 100 and protector 103 caused by thermal expansion and contraction of pipe 100.

Referring to FIGS. 13 to 16, there is shown a fourth embodiment of the invention of a protector used as a plug for covering the internal threads 201 of a pipe 200. Protector 203 has a tubular body 204 that convergingly tapers in a forward direction. The body 204 has an outside wall 206 and an inside wall 207. The walls 206 and 207 extend between a forward or first end 208 and a large rear or second end 209. End 209 has an outwardly directed annular lip providing a forward annular shoulder 211. Lip 209 has a plurality of circumferentially spaced notches or grooves 212 to accommodate a tool to turn and remove protector 203 from threaded end section 201.

A plurality of rows of circumferentially spaced first ribs 213 are integral with the outside wall 206. The ribs 213 are integral with the outside wall 206. The ribs 213 are arcuate flexible tabs or members that extend in a forward direction at an acute angle relative to the outside wall 206 and the longitudinal axis 217 of protector 203. As shown in FIGS. 13, 14 and 15, protector 203 has four rows of circumferentially spaced ribs 213. A plurality of circumferentially spaced second ribs 216 are located in close proximity to the rear or outside portions of first ribs 213. Second ribs 216 are shorter in height than the first ribs and function as biasing and holding members for the first ribs 213 when protector 213 is moved into asseembled relation with the threaded end section 201.

In use, protector 203 is located in axial alignment with the threaded end section 201 of pipe 200 as shown in FIG. 14.

The first end 208 of the protector has a dimension smaller than the inside dimension D of pipe 200 thereby allowing body 204 to be disposed in telescopic confronting relation relative to the internal threads of threaded end section 201. Body is located inwardly from the threads of threaded end section 201 and forms an annular space 221 to allow for the thermal expansion and contraction of pipe 200 without applying circumferential and radial destructive stress on body 204. As the protector 203 is inserted into threaded end 201 the first flexible ribs 213 engage the threads and are flexed back or reverted to a reverse position. The outer ends of ribs 213 are in interlocking engagement with the threads of threaded end 201. Ribs 213, when flexed to a rearward direction engage the outer ends of second ribs 216. The second ribs 216 function as annular springs or biasing members that urge the reverse flexed first ribs 213 in an outward direction into a relatively tight engagement with the internally threaded end section 201. This wedges ribs 213 into a holding relation with respect to the internal threads thereby lock protector 203 onto pipe 200. Protector 203 will remain in assembled relation with pipe 201 and withstand substantial vibration and temperature changes of pipe 201. It will not pop out or become loose as the memory and spring characteristics of ribs 213 and 216 allow both ribs to flex and adjust their positions with respect to the threads of the threaded end section 201. The protector 203 will remain within threaded end section 201 until it is intentionally removed with the use of a tool. The tool is inserted into the notches 213 and is used to twist or turn the protector 213 out of threaded end section 201.

From the foregoing, it should be understood that the present invention provides a means for protecting the threads upon an end section of a piece of pipe or tube in a manner which does not limit where the protector can be applied and removed. It is a reliable protector and can be reused. Its shape in all embodiments lends itself to be readily molded in one piece. The flexing action on the part of the ribs allows the protector to be used with thread parts other than the spiral type shown in the drawings. An exact match of threading is not required to achieve the objects of the present invention.

It is noted that modifications and variations of the present protection for pipe threads are possible in light of the above teachings. It is therefore to be understood that within the scope of the appended claims the invention may be practiced otherwise than as specifically described in the foregoing embodiments.

The embodiments of the invention in which an exclusive property or privilege is claimed are defined as follows:

1. A removable protector and a cylindrical pipe having a tapered and threaded end section extending axially from one end thereof, wherein said pipe is subject to moisture and temperature extremes, said protector having a tubular body of substantially rigid plastic material located substantially concentric in unsealed relation with respect to said threaded end section of the pipe to protect the same, said tubular body having a first end, a second end opposite therefrom, a longitudinal axis therethrough, and inner and outer wall surfaces extending between said ends, said body first end having radially projecting stop means thereon located in engagement with said pipe to limit telescoping motion with respect thereto, said tubular body wall surfaces having a taper between the ends thereof substantially similar to that of the tapered and threaded end section of the pipe with which the same is telescopingly associated, one of said wall surfaces of said body being disposed in spaced telescoped confronting relation to said threaded end section of the pipe, a plurality of circumferentially disposed flexible ribs extending freely from said one of said wall surfaces in engagement with said threaded end section of the pipe, said ribs forming an acute angle with said body wall surface in unflexed condition and normally extending in a direction from said first end toward said second end of said body, said ribs having sufficient flexibility to revert upon engagement and axial telescoping motion with respect to a said threaded end section of the pipe thereby to extend in a direction from said body second end towards said body first end, said wall surface of said body with said ribs thereon having a diameter sufficient to radially space said wall surface of said body with said ribs from said threaded end section of the pipe so that said reverse flexing of said ribs occurs upon telescoping said protector with respect to said pipe, and to preclude circumferential and radial destructive stress contact between said threaded end section of the pipe and said protector wall surface having said ribs upon thermal expansion and contraction of said pipe, and wherein said spacing allows fluids to flow through the space, said stop means at said body first end having means for cooperation with a tool to unthread the protector when desired from a said threaded end section of the pipe.

2. The protector and pipe of claim 1 wherein: said ribs are on said inner wall surface for cooperation with a tapered and externally threaded end section of the pipe.

3. The protector and pipe of claim 2 wherein: said ribs comprise a plurality of circumferentially disposed arcuate rib segments, adjacent rib segments being separated from each other to provide spaces allowing fluids to flow through said protector when mounted on the threaded end section of the pipe.

4. A removable protector for a tapered and internal threaded end section of a cylindrical pipe extending axially from one end thereof, wherein said pipe is subject to moisture and temperature extremes, said protector comprising: a tubular body of substantially rigid plastic material for telescoping reception and substantially concentric positioning in unsealed relation with respect to a said threaded end section of the pipe to protect the same, said tubular body having a first end, a second end opposite therefrom, a longitudinal axis therethrough, and inner and outer wall surfaces extending between said ends, said body first end having radially projecting stop means thereon for engagement with said pipe to limit telescoping motion with respect thereto, said tubular body wall surfaces having a taper between the ends thereof substantially similar to that of the tapered and threaded end section of the pipe with which the same is telescopingly associated, said outer wall surface of said body adapted to be disposed in spaced telescoped confronting relation to said internal threaded end section of the pipe, a plurality of circumferentially disposed flexible ribs extending freely from said outer wall surface of the body for engagement with a threaded end section of the pipe, said ribs being disposed on said outer wall surface of said body for cooperative association with the tapered and internally threaded end section of the pipe, said ribs forming an acute angle with said body wall surface in unflexed condition and normally extending in a direction from said first end toward said second end of said body, said ribs having sufficient flexibility to revert upon engagement and axial telescoping motion with respect to a said threaded end section of the pipe thereby to extend in a direction from said body second end towards said body first end, said outer wall surface of said body with said ribs thereon having a diameter sufficient to radially space said outer wall surface from said threaded end section of the pipe so that said reverse flexing of said ribs occurs upon telescoping said protector with respect to said pipe, and to preclude circumferential and radial destructive stress contact between said threaded end section of the pipe and said protector wall surfaces upon thermal expansion and contraction of said pipe, and wherein said spacing allows fluids to flow through the space, said stop means at said body first end having means for cooperation with a tool to unthread the protector when desired from a said threaded end section of the pipe.

5. The protector of claim 4 wherein: said ribs comprise a plurality of circumferentially disposed arcuate rib segments, adjacent rib segments being separated from each other to provide spaces allowing fluids to flow through said protector when mounted on the threaded end section of the pipe.

6. A removable protector for a tapered and threaded end section of a cylindrical pipe extending axially from one end thereof, wherein said pipe is subject to moisture and temperature extremes, said protector comprising: a tubular body of substantially rigid plastic material for telescoping reception and substantially concentric positioning in unsealed relation with respect to said threaded end section of the pipe to protect the same, said tubular body having a first end, a second end opposite therefrom a longitudinal axis therethrough, and inner and outer wall surfaces extending between said ends, said body first end having radially projecting stop means thereon for engagement with said pipe to limit telescoping motion with respect thereto, said tubular body wall surfaces having a taper between the ends thereof substantially similar to that of the tapered and threaded end section of the pipe with which the same is telescopingly associated, one of said wall surfaces of said body adapted to be disposed in spaced telescoped confronting relation to said threaded end section of the pipe, a plurality of circumferentially disposed flexible ribs extending freely from said one of said wall surfaces for engagement with a threaded end section of the pipe, said ribs comprise first rib members engageable with the threaded end section of the pipe and second rib members located adjacent said first rib members, said ribs forming an acute angle with said body wall surface in unflexed condition and normally extending in a direction from said first end toward said second end of said body, said ribs having sufficient flexibility to revert upon engagement and axial telescoping motion with respect to a said threaded end section of the pipe thereby to extend in a direction from said body second end towards said body first end, said first rib members when reverted located in engagement with the second rib members whereby the second rib members bias the first rib members into engagement with the threaded end section of the pipe, said wall surface of said body with said ribs thereon having a diameter sufficient to radially space said wall surface from a said threaded end section of the pipe so that said reverse flexing of said ribs occurs upon telescoping said protector with respect to said pipe, and to preclude circumferential and radial destructive stress contact between said threaded end section of the pipe and said protector wall surface having said ribs upon thermal expansion and contraction of said pipe, and wherein said spacing allows fluids to flow through the space, said stop means at said body first end having means for cooperation with a tool to unthread the protector when desired from a said threaded end section of the pipe.

7. The protector of claim 6 wherein: said first rib members comprise a plurality of circumferentially spaced rib segments.

8. The protector of claim 6 wherein: said first rib members comprise a plurality of circumferentially spaced first rib segments, and the second rib members comprise a plurality of circumferentially spaced second rib segments located adjacent the first rib segments.

9. The protector of claim 6 wherein: said first rib members and second rib members are joined to said outer wall surface of said body, said first rib members cooperating with a tapered and internally threaded end section of the pipe.

10. The protector of claim 9 wherein: said first rib members and second rib members each comprise circumferentially disposed arcuate rib segments, adjacent rib segments being separate from each other to provide spaces allowing fluids to flow through said protector when mounted on the threaded end section of the pipe.

11. The protector of claim 6 wherein: said first rib members and second rib members are joined to said inner wall surface of said body, said first rib members cooperating with a tapered and externally threaded end section of the pipe.

12. The protector of claim 11 wherein: said first rib members and second rib members each comprise circumrerentially disposed arcuate rib segments, adjacent rib segments being separated from each other to provide spaces allowing fluids to flow through said protector when mounted on the threaded end section of the pipe.

13. A removable protector and a cylindrical pipe having a tapered and threaded end section, said protector having a tubular body of substantially rigid plastic material mounted on threaded end section of the pipe to protect the same, said tubular body having a first end having radially projecting stop means thereon engageable with said pipe to limit telescoping motion with respect thereto, said body having wall surfaces taper between the ends thereof substantially similar to that of the tapered and threaded end section of the pipe with which the same is telescopingly associated, one of said wall surfaces of said body being disposed in telescoped confronting relation to said threaded end section of the pipe, a plurality of circumferentially disposed flexible rib means extending freely from said one of said wall surfaces for engagement with the threaded end section of the pipe, said rib means forming an acute angle with said one of said wall surfaces in unflexed condition and normally extending in a direction from said first end toward said second end of said body, said rib means having sufficient flexibility to revert upon engagement with a said threaded end section of the pipe thereby to extend in a direction from said body second end towards said first end of the body, said one of said wall surfaces of said body with said rib means thereon having a size sufficient to radially space said one of said wall surfaces from a said threaded end section of the pipe so that said reverse flexing of said rib means occurs upon telescoping said protector with respect to said threaded end section of the pipe and to preclude stress contact between said threaded end section of the pipe and said wall surface having the rib means and allow fluids to flow through the space.

14. A removable protector for a tapered and internally threaded end section of a cylindrical pipe comprising: a tubular body of substantially rigid plastic material for telescoping reception with respect to said threaded end section of the pipe to protect the same, said tubular body having a first end having radially projecting stop means thereon for engagement with said pipe to limit telescoping motion with respect thereto, said body having an outer wall surface taper between the ends thereof substantially similar to that of the tapered and internally threaded end section of the pipe with which the same is telescopingly associated, said outer wall surface of said body being adapted to be disposed in telescoped confronting relation to said threaded end section of the pipe, a plurality of circumferentially disposed flexible rib means disposed on and extending freely from said outer wall surface for cooperative engagement with the internally threaded end section of the pipe, said rib means forming an acute angle with said outer wall surface for cooperative engagement with the internally threaded end section of the pipe, said rib means forming an acute angle with said outer wall surface in unflexed condition and normally extending in a direction from said first end toward said second end of said body, said rib means having sufficient flexibility to revert upon engagement with a said threaded end section of the pipe thereby to extend in a direction from said body second end towards said first end of the body, said outer wall surface of said body with said rib means thereon having a size sufficient to radially space said outer wall surface from said threaded end section of the pipe so that said reverse flexing of said rib means occurs upon telescoping said protector with respect to said threaded end section of the pipe and to preclude stress contact between said threaded end section of the pipe and said outer wall surface having the rib means and allow fluids to flow through the space.

15. The protector of claim 14 wherein: said rib means comprise a plurality of circumferentially disposed arcuate rib segments, adjacent rib segments being separated from each other to provide spaces allowing fluids to flow through said protector when mounted on the threaded end section of the pipe.

16. The protector and pipe of claim 13 wherein: said rib means are on said inner wall surface for cooperation with a tapered and externally threaded pipe end section.

17. The protector and pipe of claim 16 wherein: said rib means comprise a plurality of circumferentially disposed arcuate rib segments, adjacent rib segments being separated from each other to provide spaces allowing fluids to flow through said protector when mounted on the threaded end section of the pipe.

18. A removable protector for a tapered and threaded end section of a cylindrical pipe comprising: a tubular body of substantially rigid plastic material for telescoping reception with respect to said pipe threaded end section of the pipe to protect the same, said tubular body having a first end having radially projecting stop means thereon for engagement with said pipe to limit telescoping motion with respect thereto, said body having wall surfaces tapered between the ends thereof substantially similar to that of the tapered and threaded end section of the pipe with which the same is telescopingly associated, one of said wall surfaces of said body being adapted to be disposed in telescoped confronting relation to said threaded end section of the pipe, a plurality of circumferentially disposed flexible rib means extended freely from said one of said wall surfaces for engagement with a threaded end section of the pipe, said rib means comprise first rib members engageable with the threaded end section of the pipe and second rib members located adjacent said first rib members, said rib means forming an acute angle with said one of said wall surfaces in unflexed condition and normally extending in a direction from said first end toward said second end of said body, said rib means having sufficient flexibility to revert upon engagement with said threaded end section of the pipe thereby to extend in a direction from said second end towards said first end of the body, said first rib members when reverted located in engagement with the second rib members whereby the second rib members bias the first rib members into engagement with the threaded end section of the pipe, said one of said wall surfaces of said body with said rib means thereon having a size sufficient to radially space said one of said wall surfaces from said threaded end section of the pipe so that said reverse flexing of said rib means occurs upon telescoping said projector with respect to said threaded end section of the pipe and said wall surface having the rib means.

19. The protector of claim 18 wherein: said first rib members comprise a plurality of circumferentially spaced first rib segments, and second rib members comprise a plurality of circumferentially spaced second rib segments located adjacent the first rib segments.

20. The protector of claim 18 wherein: said first rib members and second rib members are joined to said outer wall surface of said body, said first rib members cooperating with a tapered and internally threaded end section of the pipe.

21. The protector of claim 20 wherein: said first rib members and second rib members each comprise circumferentially disposed arcuate rib segments, adjacent rib segments being separated from each other to provide spaces allowing fluids to flow through said protector when mounted on the threaded end section of the pipe.

22. The protector of claim 18 wherein: said first rib members and second rib members are joined to said inner wall surface of said body, said first rib members cooperating with a tapered and externally threaded end section of the pipe.

23. The protector of claim 22 wherein: said first rib members and second rib members each comprise circumferentially disposed arcuate rib segments, adjacent rib segments being separated from each other to provide spaces allowing fluids to flow through said protector when mounted on the threaded end section of the pipe.

24. The protector of claim 18 wherein: the stop means includes means for cooperation with a tool to unthread the protector when desired from said threaded end section of the pipe.

* * * * *